(12) United States Patent
Peacock et al.

(10) Patent No.: US 10,366,521 B1
(45) Date of Patent: Jul. 30, 2019

(54) AUGMENTED REALITY ASSEMBLY ASSISTANCE AND MONITORING

(71) Applicant: Amazon Technologies, Inc., Seattle, WA (US)

(72) Inventors: Jason Leonard Peacock, Bellevue, WA (US); Joshua John Watson, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/460,015

(22) Filed: Mar. 15, 2017

(51) Int. Cl.
| | |
|---|---|
| G06T 11/60 | (2006.01) |
| G06F 1/16 | (2006.01) |
| G06F 3/16 | (2006.01) |
| G06F 3/00 | (2006.01) |
| G02B 27/01 | (2006.01) |

(52) U.S. Cl.
CPC ............ G06T 11/60 (2013.01); G02B 27/017 (2013.01); G06F 1/163 (2013.01); G06F 3/005 (2013.01); G06F 3/16 (2013.01); G02B 2027/014 (2013.01); G02B 2027/0138 (2013.01); G02B 2027/0141 (2013.01); G02B 2027/0178 (2013.01)

(58) Field of Classification Search
CPC .................. G06T 11/60; G02B 27/017; G02B 2027/0138; G02B 2027/014; G02B 2027/0141; G02B 2027/0178; G06F 1/163; G06F 3/005; G06F 3/16
See application file for complete search history.

(56) References Cited

U.S. PATENT DOCUMENTS

| | | |
|---|---|---|
| 7,131,060 B1 | 10/2006 | Azuma |
| 9,711,053 B1 | 7/2017 | Williamson et al. |
| 2009/0099761 A1 | 4/2009 | Davis et al. |
| 2011/0196599 A1 | 8/2011 | Feyereisen et al. |
| 2012/0170812 A1 | 7/2012 | Kamiyama |
| 2013/0162632 A1* | 6/2013 | Varga ................... G06T 19/006 345/419 |
| 2013/0261850 A1 | 10/2013 | Smith et al. |
| 2014/0039734 A1 | 2/2014 | Ramaiah et al. |
| 2014/0306950 A1 | 10/2014 | Russi et al. |
| 2015/0353206 A1 | 12/2015 | Wang |
| 2016/0203639 A1 | 7/2016 | Bostick et al. |
| 2016/0292925 A1* | 10/2016 | Montgomerie ....... G06T 19/006 |
| 2016/0300178 A1* | 10/2016 | Perry ............. G06Q 10/063112 |

(Continued)

Primary Examiner — Chong Wu
(74) Attorney, Agent, or Firm — Athorus, PLLC

(57) ABSTRACT

Described are systems and methods for providing augmented reality information to workers to assist the workers in assembly of objects, such as aerial vehicles. An object or parts of an object may be determined by processing of image data corresponding to a field of view of a pair of augmented reality glasses worn by a worker to determine an object or a part corresponding to an object that is to be assembled by the worker. Based on the determined object and/or part, augmented reality information corresponding to an assembly task may be determined and visually presented to the worker to aid the worker in completion of the assembly task. The augmented reality information may be visually presented by the augmented reality glasses such that the worker can view the augmented reality information and the object or parts concurrently.

20 Claims, 14 Drawing Sheets

(56) References Cited

U.S. PATENT DOCUMENTS

| | | | |
|---|---|---|---|
| 2016/0328887 A1* | 11/2016 | Elvezio | ................... G06T 19/20 |
| 2016/0349849 A1 | 12/2016 | Kwon et al. | |
| 2017/0098333 A1 | 4/2017 | Varga | |
| 2017/0324437 A1 | 11/2017 | Ruttler et al. | |
| 2017/0358140 A1 | 12/2017 | Kohler et al. | |
| 2018/0120829 A1 | 5/2018 | Price | |

* cited by examiner

AUGMENTED REALITY ASSEMBLY ASSISTANCE AND MONITORING

BACKGROUND

In an assembly environment, different parts may be assembled to form a finished product, also referred to herein as an object. Many different types of assembly environments exist for different objects. For example, automobiles, toys, games, computers, etc., are all typically assembled from various parts in an assembly environment.

In a typical assembly environment, workers must be trained on how to assemble various parts and/or different workers may assemble different parts of an object. For example, one worker may assemble the door panel of an automobile and then the object (automobile) may progress to a different worker that assembles another part. While such an assembly line may be efficient, it is a monotonous process for workers.

In addition, in typical assembly environments, if there is a problem with assembly of parts, the assembly process is halted, an engineer or other operator is contacted and assembly does not resume until the issue is resolved. This requires that trained engineers or other workers with the skills necessary to resolve issues be located on-site. Otherwise, an assembly problem may delay assembly of objects for a long duration while the engineer travels to the assembly environment.

DETAILED DESCRIPTION

As is set forth in greater detail below, the present disclosure is directed to systems and methods for virtually illustrating content information, such as assembly task information. For example, the systems and methods disclosed herein determine a work-in-progress ("WIP") object that is being assembled in an assembly environment and present augmented reality ("AR") data that includes assembly instructions to a worker. In addition to determining the WIP object, the assembly environment may be scanned to determine the process of assembly and parts of the object remaining for assembly. For example, a marking or other identifier on an external surface of a part located within the assembly environment, such as a part of an aerial vehicle (object), may be detected through use of a scanning device mounted to or otherwise associated with a computer system (including but not limited to augmented reality glasses ("AR glasses") or other wearable devices), to identify the object. The AR glasses may then be used to display information, such as assembly instructions, regarding the part and/or the object.

Thus, where one or more of the systems and methods disclosed herein causes a reading of an identifier on an object, the marking or the identifier may act as a gateway to any type or form of metadata or additional information regarding the part or the object which may then be provided to a user, even at a distance from the part of the object, or with little to no physical interaction or contact with the part or the object itself. In this regard, information regarding a part or an object, such as an aerial vehicle and/or a part of an aerial vehicle, may be identified and presented to workers quickly and more efficiently than according to prior art systems and methods.

Figure 1A:
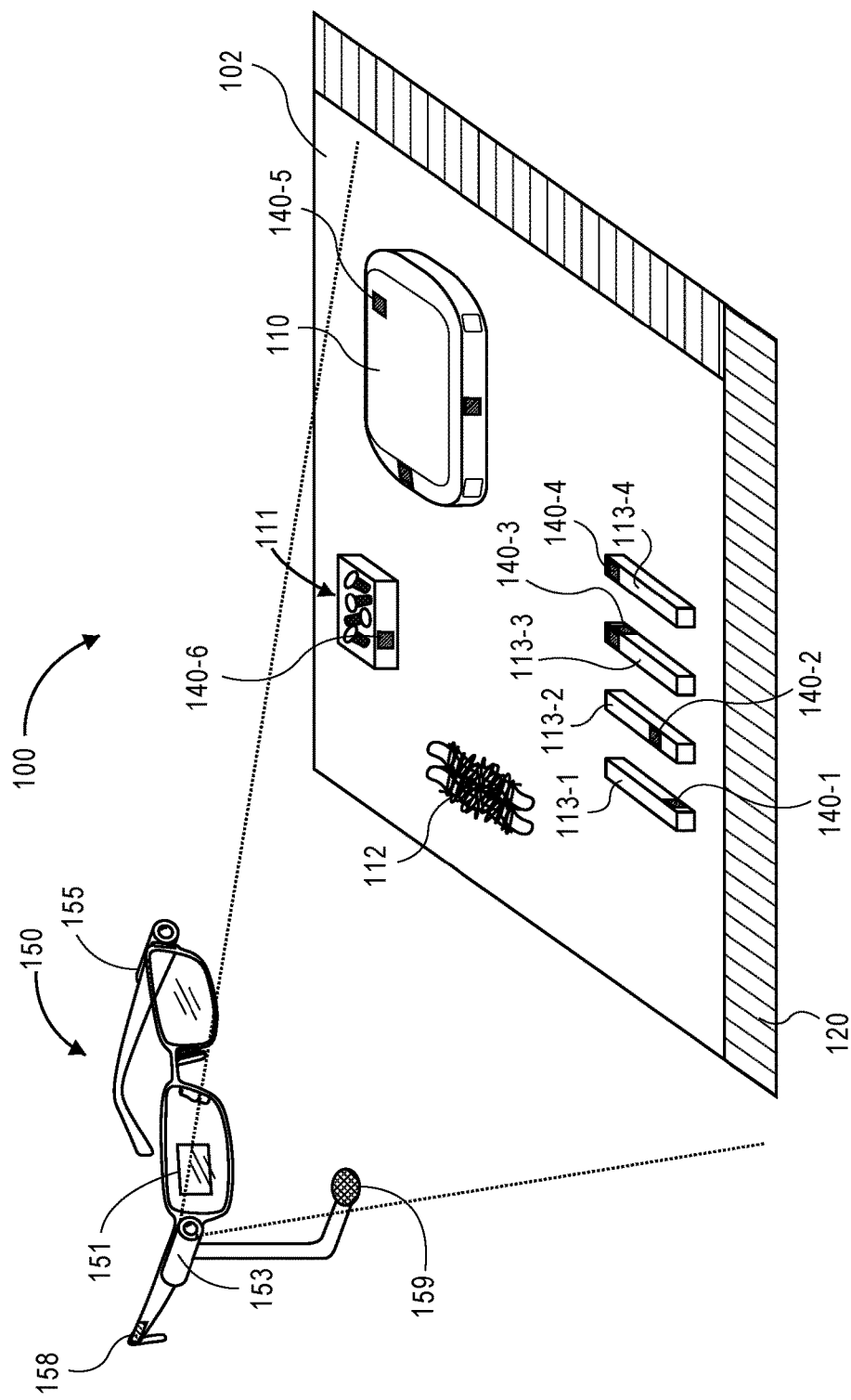
FIG. 1A illustrates an assembly environment that utilizes augmented reality glasses ("AR glasses") to provide assembly assistance to workers as part of an assembly process, in accordance with implementations of the present disclosure.

Referring to FIG. 1A an environment 100 including a WIP object, such as an aerial vehicle that is being assembled, may be positioned on a workstation 102 and be evaluated by a wearable computer device 150 (e.g., a pair of AR glasses) is shown. The wearable computer device 150 includes a wearable frame, an eye-level display 151, a sensor 153, an imaging device 155, one or more speakers 158, and a microphone 159. In some implementations, the wearable computer device 150 may be manufactured to comply with one or more safety guidelines or regulations for protective eyewear. As is shown in FIG. 1A, the sensor 153 evaluates a portion of the workstation 102 to detect objects located at the workstation. According to the systems and methods of the present disclosure, the wearable computer device 150 may read and interpret identifiers 140 on the parts 113, 110, and/or on other components located at the workstation. In addition or as an alternative thereto, the imaging device 155 may obtain images of the workstation and the images may be processed to detect the identifiers 140 and/or detect objects located at the workstation 102. For example, images may be processed using one or more image processing algorithms (e.g., edge detection and/or object detection algorithm) to detect objects and/or identifiers located at the workstation 102.

The workstation may also include one or more scales 120 of a known size, shape, position, and/or pattern that may be represented in the images obtained by the imaging device 155. The scale 120 provides a reference that aids in the processing of the image data to determine size and/or position information corresponding to parts and/or other items located at the workstation.

In the example illustrated in FIG. 1A, the workstation 102 includes a body 110 of an aerial vehicle, four motor arms 113-1, 113-2, 113-3, and 113-4, motor cables 112, and a box 111 containing screws. In some implementations, each part or other item located in the workstation may include an identifier 140, such as a quick response (QR) code, barcode, bokode, or other identifier that is detectable by the sensor 153 and/or via image processing of images obtained by the imaging device of the computing device. In other implementations, the identifiers 140 may not be unique but may be at unique positions on different parts, thereby uniquely identifying each part and/or the orientation of each part. For example, each identifier 140-1, 140-2, 140-3, and 140-4 may be uniquely positioned on each respective motor arm 113-1, 113-2, 113-3, and 113-4 such that the respective motor arm 113 and/or orientation of the motor arm 113 can be determined from the corresponding identifier 140. Likewise, in the illustrated example, the body 110 of the WIP object (aerial vehicle) includes multiple identifiers 140-5 at different positions on the body to indicate the size, shape, type and/or orientation of the body 140-5. As still another example, the box 111 containing the screws may include a unique identifier 160-6 that indices the size and/or type of screws contained in the box.

As discussed in the following examples, a wearable computing device 150, alone or in conjunction with one or more other computing components may be utilized to provide assembly instructions and/or other information to a worker at the workstation 102 to aid the worker in the assembly of the WIP object, such as an aerial vehicle. In addition, as discussed further below, the wearable computing device 150 may be configured to communicate with one or more remote computing devices and/or external users to enable a worker wearing the wearable computing device to interact with another user, provide visual and/or audible information to the other user and/or receive from the other user augmented reality information that is presented by the wearable computing device 150 to the worker wearing the wearable computing device 150.

Figure 1B:
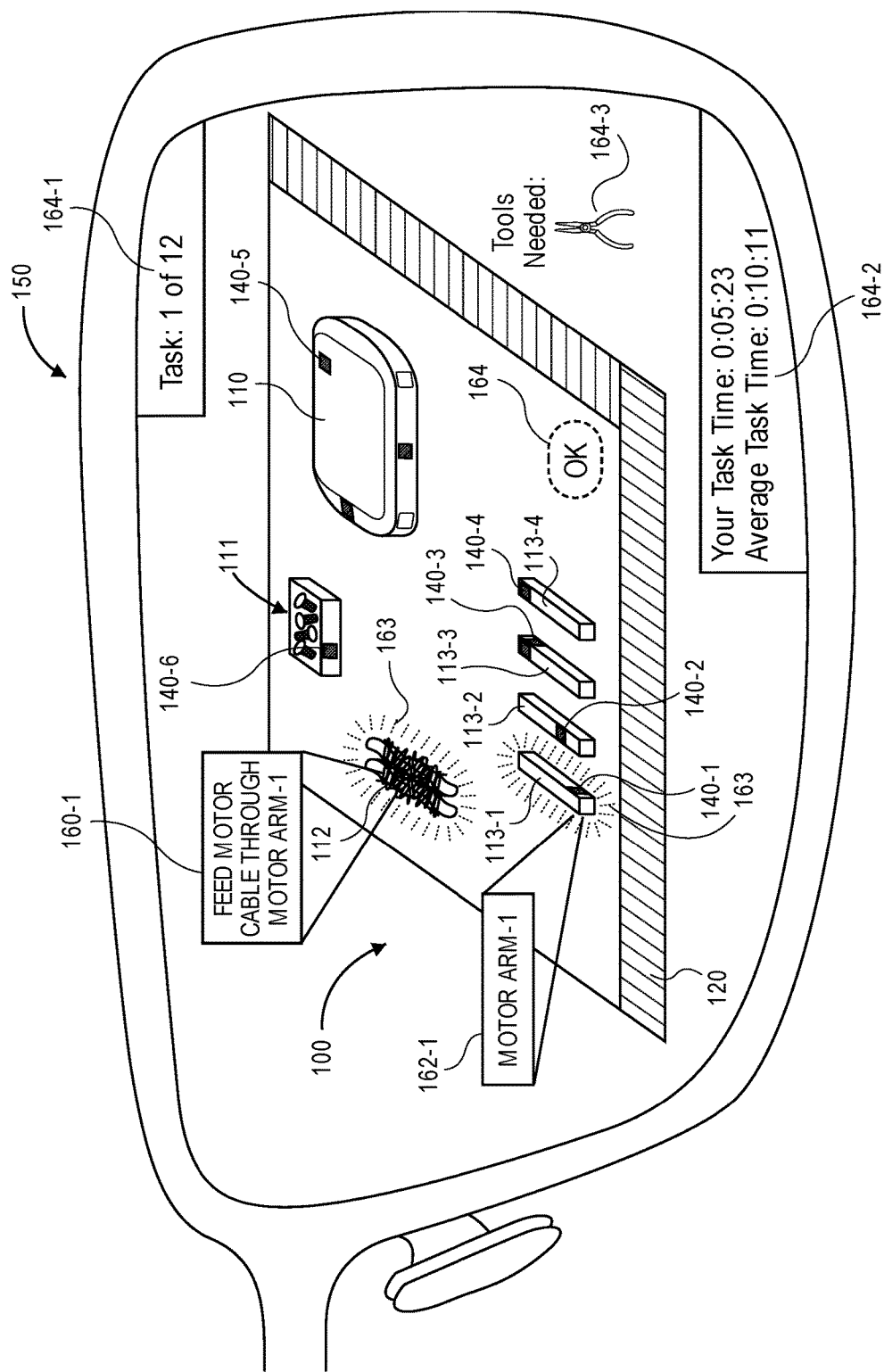
FIGS. 1B-1D illustrate various augmented reality views of the assembly environment illustrated in FIG. 1A, in accordance with implementations of the present disclosure.

Referring to FIG. 1B, illustrated is the field of view through a wearable computing device 150 of the environment 100 illustrated in FIG. 1A. In this example, the worker is being presented AR data that includes assembly instructions for assembly of an aerial vehicle (object), such as an unmanned aerial vehicle. The parts of the aerial vehicle, including the body 110, motor arms 113-1, 113-2, 113-3, and 113-4 are positioned on the workstation 102. The wearable computing device and/or one or more computing components in communication with the wearable computing device 150 determine based on the workstation 102 and/or parts detected at the workstation 102, the WIP object. Likewise, the identifiers 140-1, 140-2, 140-3, 140-4, 140-5, and 140-6 are detected to determine the parts and positions of parts at the workstation. Likewise, the scale 120 may be detected and used as a reference point for determining the relative size and/or position of parts located at the workstation 102.

Based on the determined WIP object and the parts, assembly tasks are determined and AR data corresponding to an assembly task is presented by the wearable computing device 150 to the worker such that the AR data appears concurrently with the viewed parts at the workstation, thereby providing an augmented reality of the workstation 102. For example, instructions may be presented that instruct the user to feed the motor cable through the motor arm-1 113-1, as illustrated by instructions 160-1. Likewise, other identifiers may be presented to identify the parts relevant for the presented assembly instructions. For example, information 162-1 may be presented to indicate Motor Arm-1. Likewise, an indicator 163 may be presented around the position of the parts, such as the motor cable 112 and the motor arm 113-1 relevant to the presented instructions to provide the user with an augmented reality environment that illustrates to the user the parts and assembly instructions to be performed. In still other examples, identifiers such as a Tools Needed indicator 164-3 may be presented by the wearable computing device 150 indicating to the worker the tools necessary to complete the assembly task. In some instances, images of the workstation may be processed to confirm that the tools and/or parts necessary for a task are available to the worker for completion of the assembly task. If the tools and/or parts are available, the presented information may include an indication of the tools and/or parts and/or the location of the tools and/or parts on the workstation. If the tools and/or parts necessary to complete the task are not detected at the workstation, an indication to the worker may be presented by the wearable computing device 150 informing the worker of the missing tools and/or parts and optionally providing information as to where the necessary tools and/or parts may be located and retrieved by the worker within the assembly facility. In some instances, a notification may be sent to another user, worker, or autonomous unit with instructions to deliver the missing tools and/or parts to the workstation.

Other information that may be presented by the wearable computer device 150 includes, but is not limited to, a task count or task process indicator 164-1, a task time indicator 164-2 indicating the current time used by the worker in completing the task and/or the average time required to complete the task, motivational information to encourage the worker, work hour information (e.g., time remaining in the work shift, time until the next scheduled break), worker accuracy rating information, current time of day, current day of week, etc. In some implementations, the worker may interact with the wearable computing device to specify one or more preferences of the types, amount and/or position of information that may be presented on the display of the wearable device 150 and in the field of view of the worker wearing the wearable device 150.

The presented information may be in the form of textual and/or graphical information that aids a worker in performing one or more tasks, such as object assembly, at the workstation 102. In some implementations, relevant aspects of a computer-aided drawing (CAD) may be presented by the wearable computing device 150 as part of the AR data. Likewise, the wearable computing device may process video information obtained by the imaging device of the wearable computing device to detect tasks performed by the worker and/or to determine interactions by the worker. For example, the wearable computing device 150 may preset an "OK" control 164 that appears to the worker as if it is presented on the surface of the workstation 102. The worker may interact with the augmented reality by, for example, positioning their hand over the location of the presented "OK" 164. The computer wearable device 150 processes the image to detect the presence of the user's hand at the position and determines that the position of the user's hand is a confirmation from the worker that the instructed task has been completed.

When the wearable computer device has detected that the instructed task has been completed, for example, in response to interaction from the worker and/or image processing of the WIP object, the next assembly task of the assembly may be determined and presented to the worker. For example, referring to FIG. 1C, a verification indication 164-5, such as "Good Job" or "Confirmed" may be presented to the worker by the wearable computing device 150 to indicate to the worker that the system confirms that the prior assembly task has been completed by the worker. In addition, the next assembly task in the assembly process is presented to the user as AR data by the wearable computing device 150 such that the AR data is presented within the field of view of the worker so that the worker can view the AR data and the workstation concurrently. Likewise, the task process indicator 164-4 may be updated to illustrate progress in the assembly tasks for complete assembly of the object and the task time indicator may be updated to reflect the time for the current assembly task. Likewise, the tools needed for the next assembly task may be determined and presented as an indicator 164-6. In the assembly task illustrated in FIG. 1C it is determined and indicated that no tools are needed to complete the assembly task. In this example, the next task is for the user to connect the motor cable to the coupler-1 of the body. Through the use of the augmented realty presentation, the wearable computing device indicates the specific end of the motor cable 112 by a visual indicator 163 and also visually indicates the coupler-1 162-2 so that the worker is provided clear guidance on the assembly task to be performed.

When the worker has completed the instructed task, the worker may again interact with the wearable computing device, for example by positioning their hand over the "OK" control 164 to indicate that the instructed task has been completed, and/or images may be processed to determine and/or verify task completion. As the user completes each instructed assembly task, the accuracy of the completed task may be verified, as discussed further below, and additional assembly tasks for the WIP object may be presented by the wearable computing device as part of the augmented reality presented to the worker wearing the wearable computing device 150.

Figure 1C:
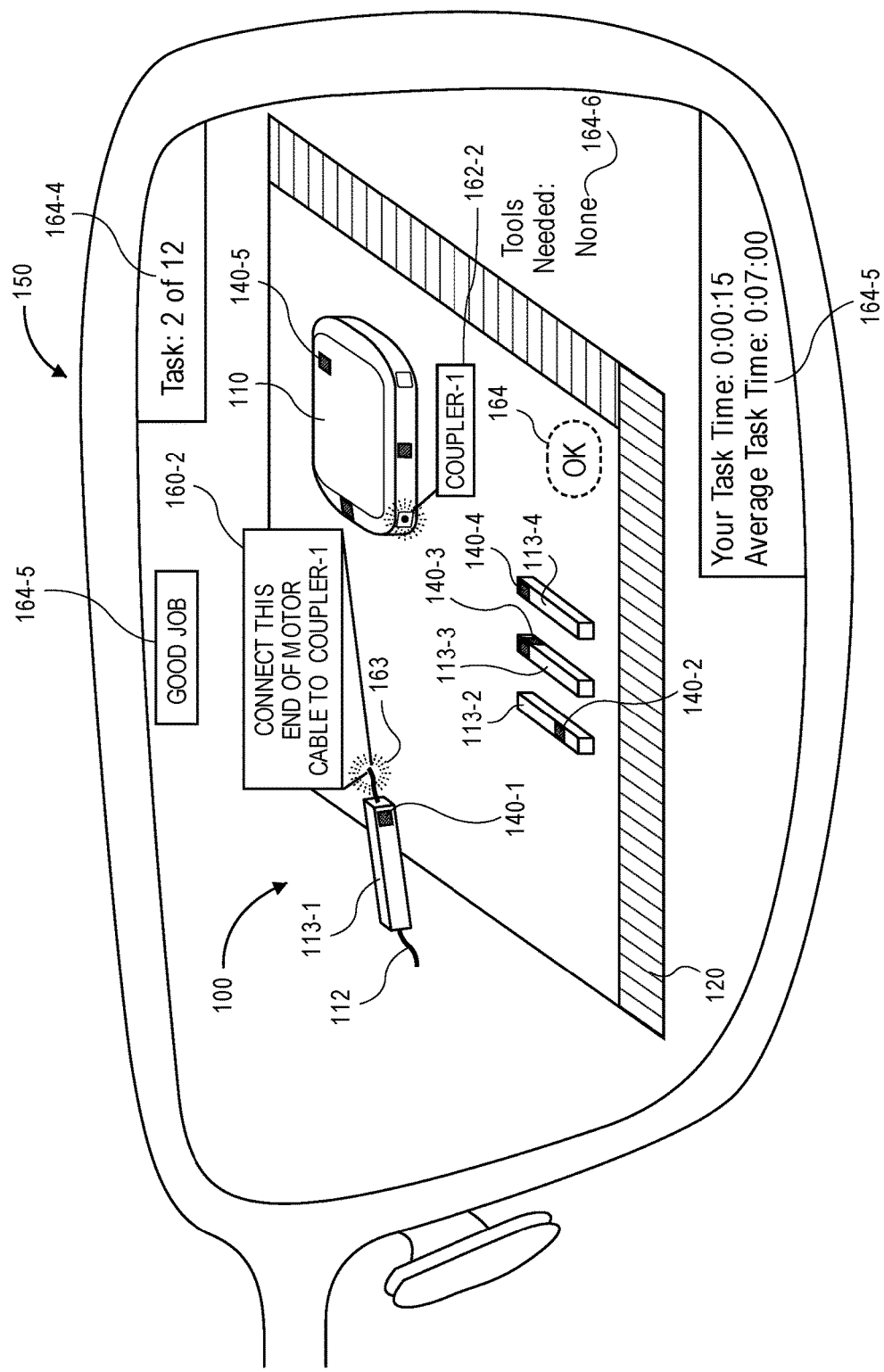
Figure 1D:
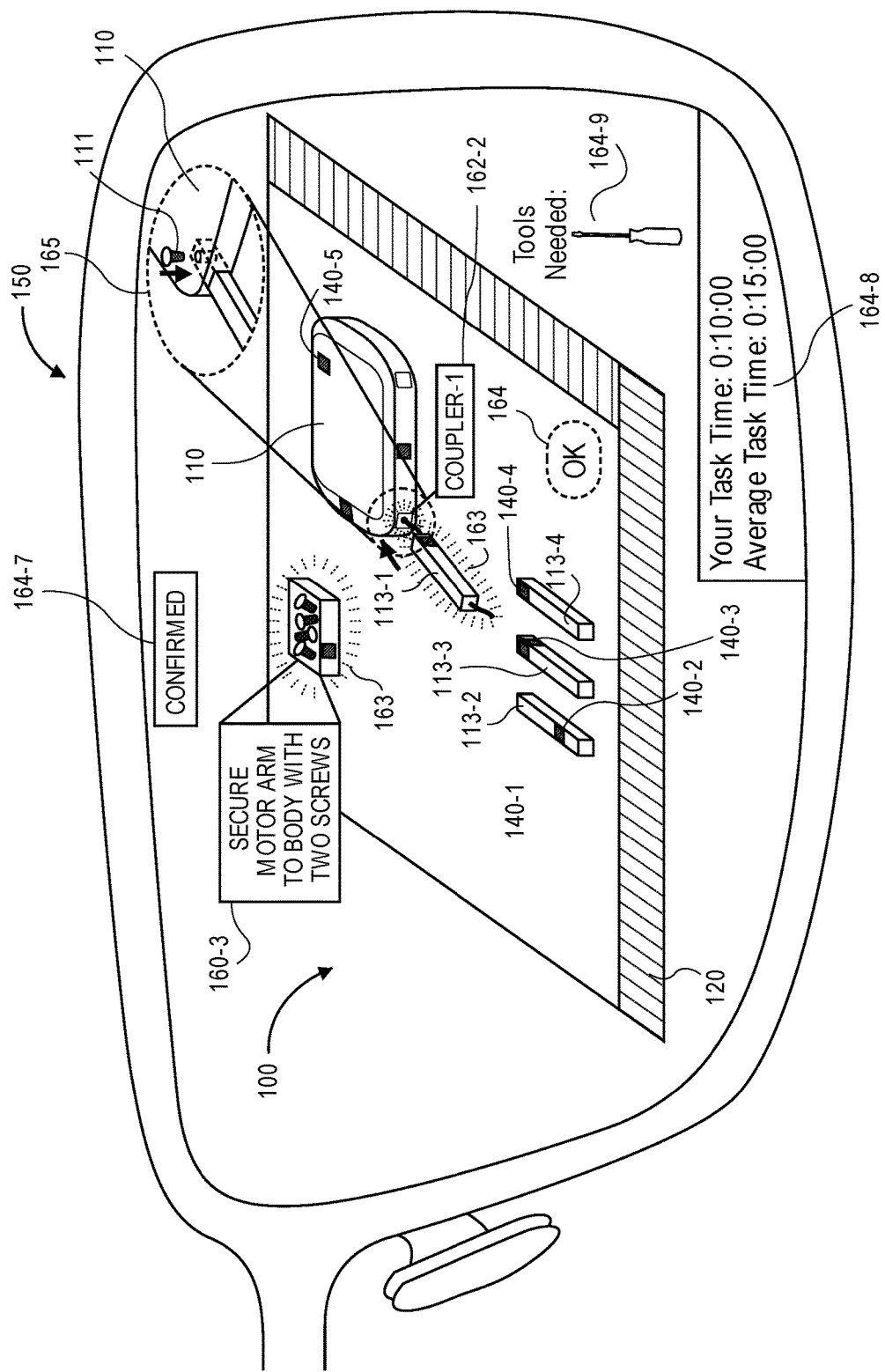

Referring to FIG. 1D, the wearable computing device may present AR data corresponding to the next assembly task to be performed in the assembly process. In this example, the next task is for the worker to secure the motor arm with two screws as illustrated by presented assembly instructions 160-3. Through the use of the augmented realty presentation, the position and/or type of screws may be visually indicated 163. Likewise, the motor arm and body to be coupled together may be visually indicated 163. In some implementations, expanded or detail assembly views (e.g., detail CAD illustrations), such as expanded view 165 may also be provided as part of the augmented reality presented to the worker by the wearable computing device 150 to assist the user in proper assembly of the WIP object. As discussed above, in some implementations, the presented information may also indicate the tools needed, as illustrated by the indicator 164-9, task time information for the task, as indicated by indicator 164-8 and/or include other confirmation or motivational information, such as the "Confirmed" indicator 164-7.

Providing assembly instructions with an augmented reality presented by a wearable computing device 150, such as AR glasses, provides a technical improvement over prior systems. For example, a worker need not receive specific advanced assembly training and may follow the presented assembly tasks and visual ques provided by the augmented reality. Likewise, the user can access assembly information, such as CAD illustrations, indicators of the proper parts, etc., without having to turn away from assembly and refer to a separate manual or other document.

Accordingly, the systems and methods of the present disclosure may recognize a part of a WIP object, such as an aerial vehicle, by scanning, reading or evaluating one or more identifiers on one or more surfaces of the parts, determining assembly tasks to be performed to assemble the WIP object, and presenting at least some of the corresponding AR data and/or assembly tasks within a field of view of a wearable computer device so that the AR data and the WIP object and/or parts are concurrently viewable by the worker.

Once a part and/or WIP object has been determined, for example, based on detected identifiers, data from a data store accessible to the wearable computer device may be accessed. Such information may include assembly instructions, size, position, weight information, etc.

Figure 2:
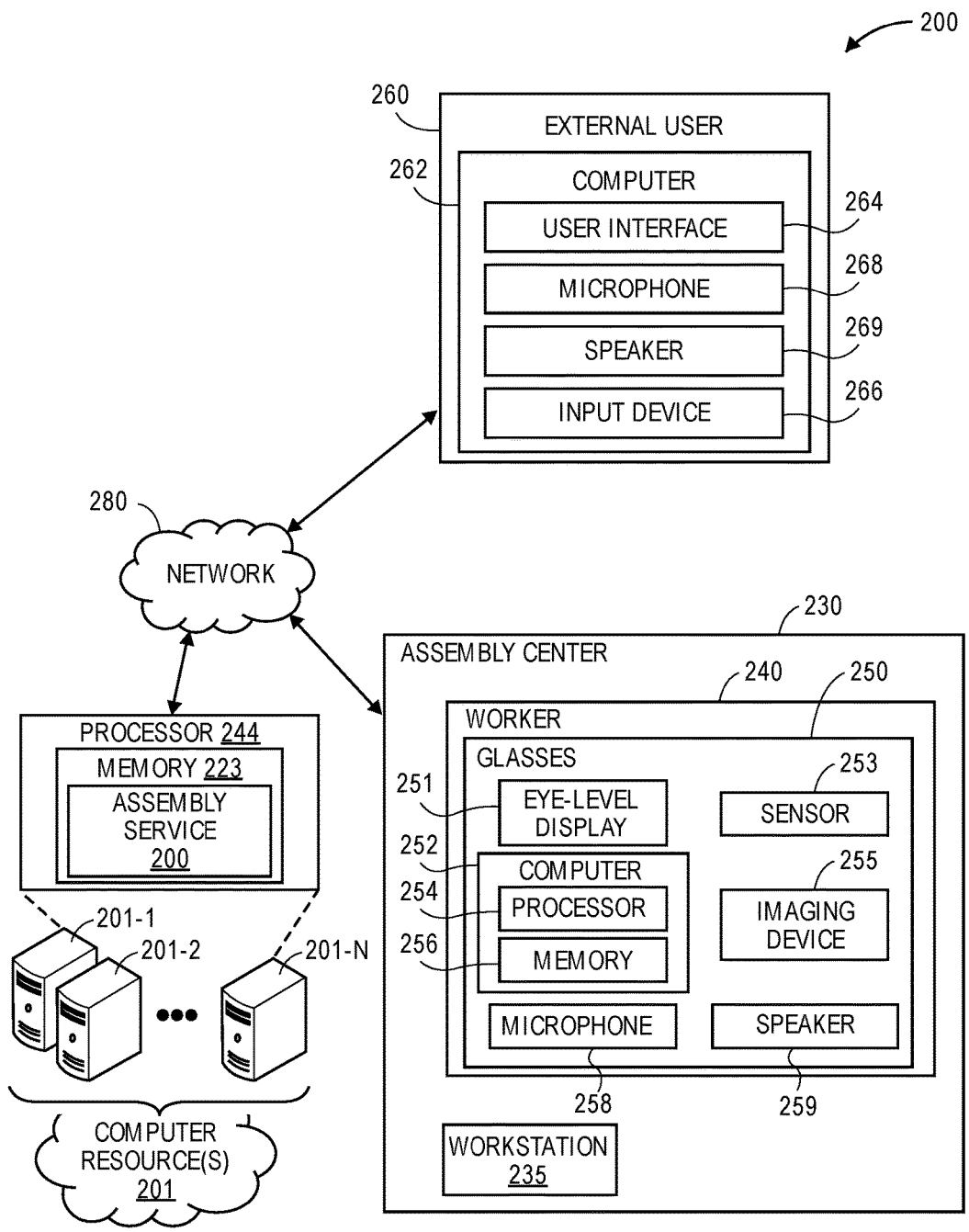
FIG. 2 is a block diagram of components of systems for virtually illustrating assembly information, in accordance with implementations of the present disclosure.

FIG. 2 is a block diagram of components of systems for virtually illustrating assembly information, in accordance with implementations of the present disclosure. As shown in FIG. 2, the system 200 includes an assembly center 230, an external user 260, and computing resources 201 that are connected to one another across a network 280, such as the Internet. The system 200 further includes a worker 240 who is associated with the assembly center 230 and is wearing a pair of augmented reality glasses 250.

The assembly center 230 may be any facility that is adapted to receive, store, process, assemble, and/or distribute objects, such as unmanned aerial vehicles. As discussed, the assembly center 230 may include one or more workstations 235 at which WIP objects are assembled using various parts to form finished objects, such as aerial vehicles. Positioned at each workstation within the assembly center is one or more workers 240 who are wearing or operating a wearable computer device such as the pair of augmented reality glasses 250.

Each worker and/or wearable computer device, such as AR glasses 250 may communicate with computer resources 201. The computer resources may be local to the assembly center and/or remote from the assembly center 230.

The computing resources 201 may form a portion of a network-accessible computing platform implemented as a computing infrastructure of processors, storage, software, data access, and other components that is maintained and accessible via a network 280. Services, such as the assembly service 203 offered by the computing resources 201, do not require that the user have knowledge of the physical location and configuration of the system that delivers the services. Devices, such as the glasses 250 or the computer 262 of the external user 260, may communicatively couple to the computing resources 201 via the network 280 which may represent wired technologies (e.g., wires, USB, fiber optic cable, etc.), wireless technologies (e.g., RF, cellular, satellite, Bluetooth, etc.), and/or other connection technologies. The network 280 carries data between the devices and the computing resources 201 and/or the assembly service 203.

As illustrated, the computing resources 201 may include one or more servers, such as servers 201-1, 201-2 . . . 201-N. These servers 201-1-201-N may be arranged in any number of ways, such as server farms, stacks, and the like that are commonly used in data centers. Furthermore, the servers 201-1-201-N may include one or more processors 244 and memory 223 which may store the assembly service 203 and execute one or more of the processes or features discussed herein.

The assembly service 203 may receive sensor data and/or image data from the glasses 250, process the data, and send information (e.g., assembly instructions) to the glasses 250 for augmented reality presentation to the worker 240. Additionally, the assembly center 230 may include one or more systems or devices for determining a location of one or more elements therein, such as cameras or other image recording devices.

Each worker 240 may operate one or more computing devices as part of an assembly process for assembling a WIP object at a workstation, such as the glasses 250 and/or another computer device (e.g., a handheld device) which may be a device that is specifically programmed or adapted for such purposes, or a general purpose device such a personal digital assistant, a digital media player, a smartphone, a tablet computer or a laptop computer, and may include any form of input and/or output peripherals such as scanners, readers, keyboards, keypads, touchscreens or pointing devices. The worker 240 may confirm his or her completion of an assembly tasks, such as by using the one or more computers or other handheld device. As illustrated, the worker 240 may wear or otherwise manipulate a pair of augmented reality glasses 250 including an eye-level display 251, a computer device 252, a sensor 253, an imaging device 255, a microphone 258, and a speaker 259. The computing device 252 includes a processor 254 and a memory 256, and may be in communication with the computer resources 201 and/or the computer 262 of the external user via the network 280, through the sending and receiving of digital data, such as video data and/or audio data. The memory 256 may contain computer program instructions that the processor 254 may execute in order to implement one or more implementations of the present disclosure, and may further include random access memory ("RAM"), read-only memory ("ROM") or any other form of persistent and/or non-transitory computer-readable media. The memory 256 may further store an operating system thereon, for the purpose of providing general administration and operation functions for the processor 254 and other components of the glasses 250, as well as other information for implementing any aspects of the present disclosure.

The eye-level display 251 may include any type or form of output device that may be positioned at or near an eye-level of the worker 240 wearing the glasses 250. The eye-level display 251 may thus include a display device that is mounted or visible within a field of view of the user, including but not limited to a sufficiently small monitor or a head-up display projected upon a lens or optical element of the glasses 250. For example, the eye-level display 251 may incorporate any of a number of active or passive display technologies, such as electronic ink, liquid crystal display (or "LCD"), LED or organic light-emitting diode (or "OLED") displays, cathode ray tubes (or "CRT"), projection screens or the like. Those of ordinary skill in the pertinent art would further realize that any other form of output device may be associated with the eye-level display 251, or may act as a substitute for the eye-level display 251.

The sensor 253 may be any form of sensing device for detecting conditions in an environment within the assembly center 230, and may be operatively or functionally joined with the computer 252 and one or more other components by any wired or wireless means. For example, the sensor 253 may be configured to read or interpret one or more external markings on an object, as well as to determine a distance between the sensor 253 and the object. Some such external markings may include images, bar codes, QR codes, bokodes, characters, numbers, symbols, or colors that are located within a specific distance or depth of field of the sensor 253. Those of ordinary skill in the pertinent art will recognize that the number or type of sensors that may be provided in accordance with the present disclosure, including but not limited to cameras or other optical sensors, temperature sensors, heat sensors, radiation sensors or position and/or orientation sensors, is not limited. Those of ordinary skill in the pertinent art will also recognize that the sensor 253 may also be or include a camera.

The imaging device 255 may be any form of optical recording device mounted to or otherwise associated with the glasses 250, e.g., a digital camera that may be mounted to a wearable frame of the glasses 250. For example, the imaging device 255 may be used to photograph or otherwise capture and record images, assembly of a WIP object, etc.

The external user may be any user, group of users, entity, machine learning system, artificial intelligence, etc., that is remote from the assembly center 230. For example, the external user may be an engineer or technician that may be contacted by a worker to resolve an assembly problem. Alternatively, the external user may monitor the progress of the worker 240. The computer 262 of the external user 260 may include a user interface 263, microphone 268, speaker 269, and an input device 266. The user interface may be any type of presentation component, such as a display that may be used to present image data and/or video data received from the glasses 250 of the worker 240 and/or from the assembly service 203. Likewise, the computer 262 may be configured to enable direct visual and/or audible communication with the glasses 250 and/or the worker 240 at the assembly center 230. As discussed further below, the external user's computer device 262 may receive audible information from the worker 240 via the speaker 269 and/or provide audible information to the worker via the microphone 268 of the computer 262 and/or provide visual information that is presented by the glasses 250 to the worker by interacting with the user interface 264 using the input device 266. The input device 266 may be any form of input device such as a touch-based display, keyboard, mouse, etc., that may be utilized by the external user 260 to provide input that is transmitted via the network 280 and presented to the worker 240.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, part, presented confirmation, presentation, and/or any other aspect of the present disclosure.

Those of ordinary skill in the pertinent arts will understand that process steps described herein as being performed by or at an "assembly center," a "worker," an "external user," "computing resources," or "glasses," or like terms, may be automated steps performed by their respective computer systems, or implemented within software modules (or computer programs) executed by one or more general purpose computers. Moreover, process steps described as being performed by an "assembly center," a "worker," an "external user," "computing resources," or "glasses," may be typically performed by a human operator, but could, alternatively, be performed by an automated agent.

The assembly center 230, worker 240, glasses 250, external user 260, computer 262, and/or computer resources 201 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the glasses 250 or the glasses computer 252 may be adapted to transmit information or data in the form of synchronous or asynchronous messages to the assembly center 230, the computer resources 201, the assembly service 203, the computer 262 or any other computer device in real time or in near-real time, or in one or more offline processes, via the network 280. Those of ordinary skill in the pertinent art would recognize that the assembly center 230, worker 240, computer resources 201, or the external user 260 marketplaces 210, may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the computer resources 201, computer 262 of the external user 260, the glasses computer 252, or any other computers or control systems utilized by the described implementations and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions.

Figure 3:
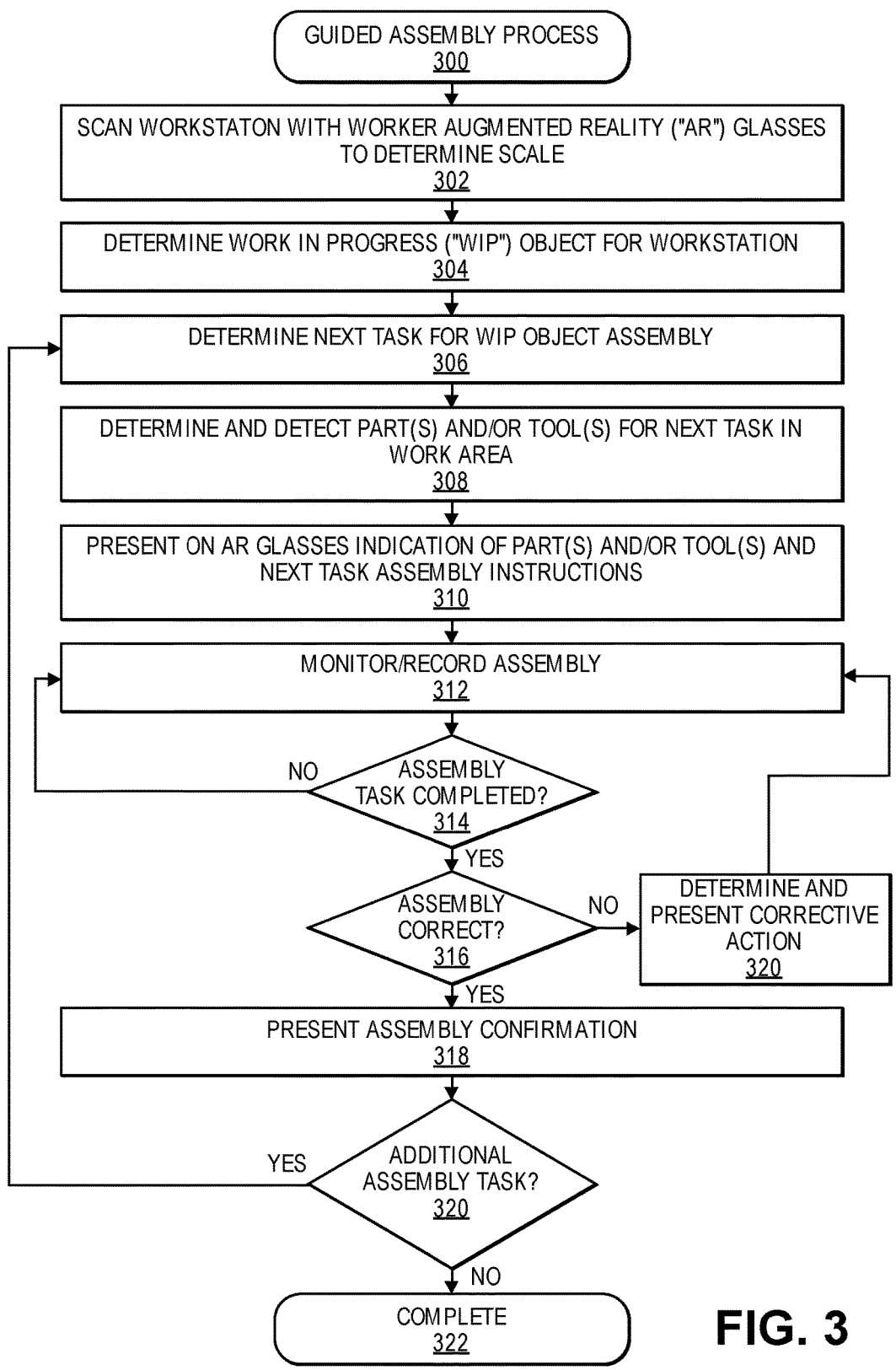
FIG. 3 illustrates an example AR assisted assembly process, in accordance with implementations of the present disclosure.

As is discussed above, the systems and methods of the present disclosure are directed to determining a WIP object at a workstation, recognizing a marking, a label or another identifier (e.g., a bar code) on parts, detecting parts based on size, shape, color etc., locating information regarding the parts and/or the assembly of the WIP object, and displaying at least some of the information as AR data to a user of a computer device, such as a pair of augmented reality glasses. Referring to FIG. 3, illustrated is an example 300 AR assisted assembly process, according to described implementations. The example process 300 begins by scanning a workstation with a pair of augmented reality glasses, as in 302. For example, referring again to FIGS. 1A-1D, a user of the glasses 150 may scan the workstation 102. Scanning of the workstation may include detecting with a sensor of the glasses an identifier associated with the workstation and/or detecting identifiers represented on parts of a WIP object that are located at the workstation. In some implementations, each workstation may include a corresponding identifier and the assembly service may maintain an indication of a WIP object assigned to the workstation for assembly.

Based on the scan of the workstation, a WIP object is determined for the workstation, as in 304. For example, if an identifier associated with the workstation is detected, the identifier may be utilized to determine from the assembly service the WIP object assigned to the workstation for assembly. In another example, based on the parts determined to be located at the workstation, the WIP object may be detected.

Based on the detected parts and the WIP object, the next assembly task for assembly of the WIP object is determined, as in 306. For example, if WIP object assembly has just begun for the WIP object at the workstation, the first assembly task is selected as the next assembly task in the WIP object assembly. In comparison, if the example process 300 has been executing and assembly of the WIP object has begun, the next assembly task in a WIP object assembly may be determined based on the last assembly task that was performed.

Based on the determined next assembly task to be performed, the parts associated with the next task, the tools necessary to complete the task and the position of those parts and/or tools on the workstation are determined, as in 308. For example, the assembly service may maintain part information and/or tool requirements corresponding to each assembly task to be performed as part of a WIP assembly. In such an implementation, the example process 300 may obtain from the assembly service the parts and/or tools corresponding to the next assembly task. Likewise, each part and/or tool may correspond to a known size, shape, color, or identifier that is detectable by the AR glasses so that the position of each part and/or tool on the workstation can be determined from the image and/or sensor data.

The example process then determines and causes presentation of AR data corresponding to the assembly task using the AR glasses, as in 310. The AR data presented by the AR glasses may include instructions and/or an indication of the parts corresponding to the assembly instruction. For example, the next assembly instructions and/or the parts may be presented on the display of the AR glasses such that the information appears in the field of view of the worker in conjunction with the parts located on the workstation. Likewise, the presentation may be such that the presentation provides a visual indication of the objects based on the determined position of the objects at the workstation, as illustrated in FIGS. 1B-1D.

If it is determined that the parts and/or tools necessary for the assembly task are not located at the workstation, AR data indicating a location from which the parts and/or tools may be retrieved may be presented. In other examples, a notification may be sent to another user or autonomous object to retrieve and/or deliver the parts and/or tools to the workstation or the worker. In some instances, as discussed further below, the AR glasses may be used to present AR data to the worker to guide the worker along a path (e.g., FIG. 9) to a location of the necessary parts and/or tools.

Upon presenting the AR data corresponding to the next assembly task and/or an indication of the parts and/or tools for the next assembly task, the example process may monitor and/or record assembly of the WIP object by the user, as in 312. For example, the imaging element of the AR glasses may be utilized to record digital video and/or still images of the assembly of the WIP object based on the field of view of the worker. The recording of the assembly may or may not include the presented AR assembly instructions and/or part indicators.

As the assembly of the next task is monitored, a determination is made as to whether the assembly task has been completed, as in 314. As discussed above, the user may interact with the AR glasses to provide an indication that the assembly task has been completed. In other implementations, images of the assembly may be processed to determine when the parts have been placed into an expected position, thereby indicating completion of the assembly task. In other implementations, assembly task completion may include a combination of user input and image processing.

If it is determined that the assembly task has not been completed, the example process 300 returns to block 312 and continues. However, if it is determined that the assembly task has been completed, a determination is made as to whether the assembly task has been correctly completed, as in 316. Determining if the assembly task has been correctly completed may be an automated, manual, or a combination of automated and manual review. For example, images of the WIP object may be processed to determine if the parts associated with the assembly task are within a defined tolerance of an expected position with respect to other parts of the WIP object. If the parts are within a defined tolerance, it may be determined that the assembly task was properly completed. As another example, if a user indicates completion of an assembly task, one or more images of the assembly task or the WIP object upon indicated completion of the assembly task may be transmitted to a computer of an external user and the external user may review the images and provide an indication as to whether the assembly task was correctly completed.

Figure 5A:
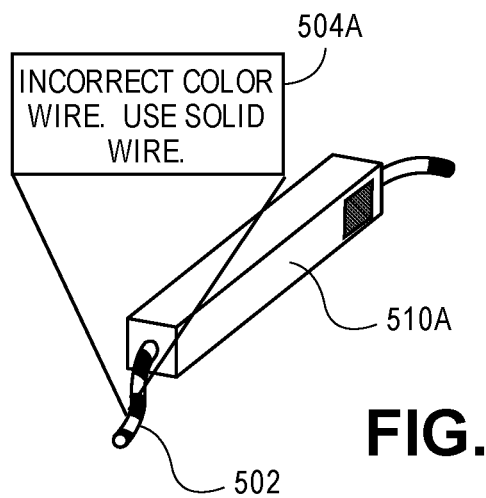
FIGS. 5A-5B illustrate various views of an augmented reality environment, in accordance with implementations of the present disclosure.

If it is determined that the assembly task was not correctly completed, corrective action is determined and presented to the user, as in 320. Corrective action may include an indication as to the additional steps or tasks to be performed to remedy the inaccuracy of the assembly task and/or to complete the assembly task. For example, referring to FIGS. 5A and 5B, upon determining that the assembly task has been completed, images of the WIP object may be processed to determine if the assembly task was correctly performed and if not, corrective action is determined and presented to the worker. Referring first to FIG. 5A, the image of the WIP object after determining that the assembly tasks of the motor wire 502 being threaded through the motor arm 510A has completed, one or more images of the WIP object may be processed and a determination may be made that the wrong motor wire was used. For example, the motor wire that was used, as illustrated in FIG. 5A includes a stripe indicator. However, the motor wire that was supposed to be used for the assembly task is a solid color motor wire. In such an example, the corrective action includes removal of the incorrect motor wire and use of the correct motor wire, in this example the solid color motor wire. Such corrective action may be visually and/or audibly presented to the worker as corrective instructions 504A. For example, the error and the corrective action, "Incorrect Color Wire. Use Solid Color Wire" may be presented on the display of the AR glasses to augment the view of the worker so that the worker can view the presented information and the workstation at the same time.

Figure 5B:
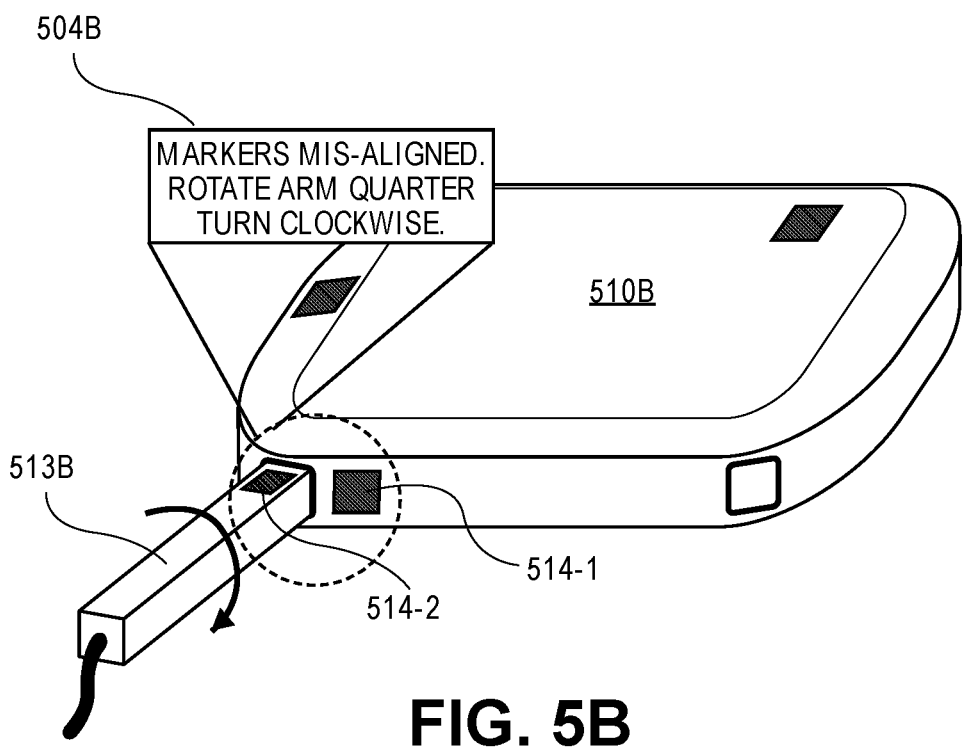

In a similar manner, in FIG. 5B images may be processed to determine that the motor arm 513B was incorrectly installed on the body 510B. For example, the assembly instructions may specify that the identifier 514-1 on the body 510B and the identifier 514-2 on the motor arm 513B are to be aligned when the motor arm is coupled to the body. However, processing of the image of the WIP object after it is determined that the assembly task has completed, indicates that the identifier 514-2 of the motor arm 513B is out of position. Additional processing may be performed to determine that to correct the error, the motor arm needs to be rotated a quarter turn clockwise. As such, the error and corrective action may be presented on the display of the glasses to the worker, as illustrated by the visual indicator 504B "Markers Mis-Aligned. Rotate Arm Quarter Turn Clockwise."

Returning to FIG. 3, after determining and presenting the corrective action at box 320, the example process returns to block 312 and continues. If it is determined at decision block 316 that the assembly task was completed correctly, an assembly conformation is presented in the augmented reality by the AR glasses to indicate to the worker that the task has been verified as accurately completed, as in 318. Additionally, a determination is made as to whether additional assembly tasks remain, as in 320. If it is determined that additional assembly tasks remain, the example process 300 returns to block 306 and continues. If it is determined that all the assembly tasks for the WIP object have been completed, the example process completes, as in 322.

Figure 4:
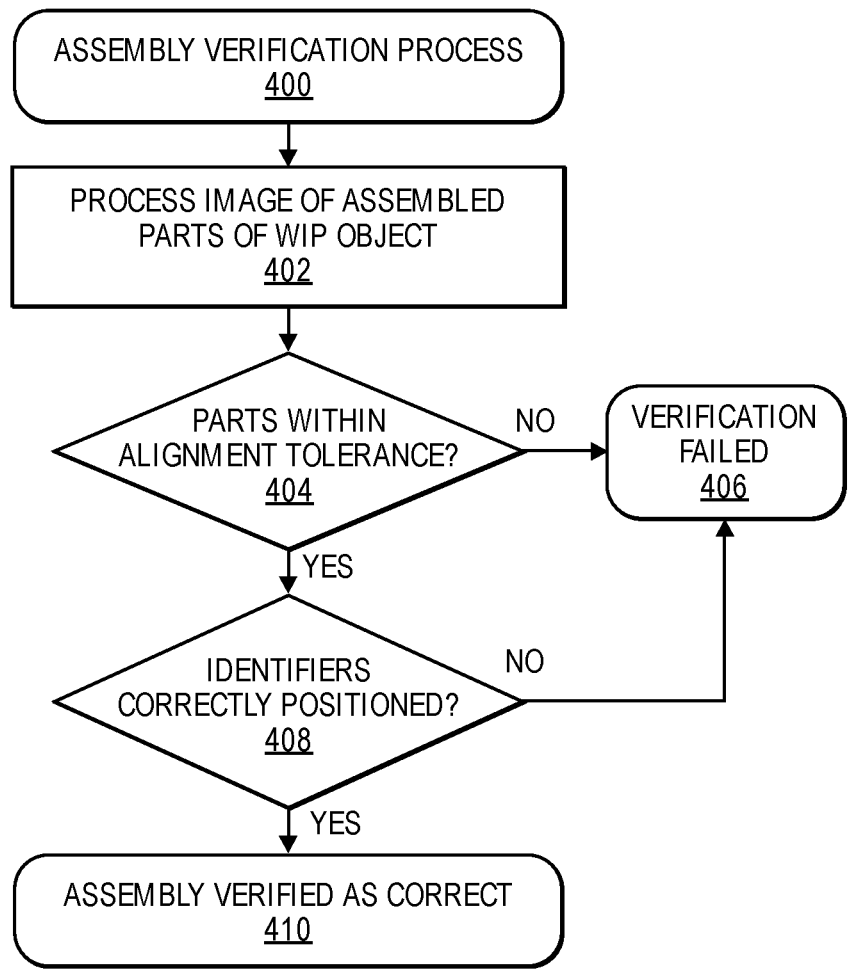
FIG. 4 illustrates an example assembly verification process, in accordance with implementations of the present disclosure.

FIG. 4 illustrates an example assembly verification process 400, in accordance with described implementations. The example process 400 may be performed as part of the example process 300 to determine if an assembly task was correctly completed. In other examples, the example process 400 may be performed on stored image data and/or video data of an assembly of a WIP object.

The example process 400 begins by processing one or more images of assembled parts of a WIP object, as in 402. As discussed above with respect to FIGS. 3, 5A, and 5B, images of assembled WIP parts may be processed upon receiving an indication of an assembly task completion. In other implementations, images of an assembly process may be continually processed and compared to an expected view of the object when an assembly task is completed.

For each assembled part, there may be an expected position and/or orientation of that part, as illustrated for example in a CAD illustration or specification of the object being assembled. Accordingly, a determination may be made from the processed image(s) as to whether the assembled part(s) are within a defined alignment tolerance, as in 404. The alignment tolerance may vary for different objects and/or different parts of different objects. For example, the alignment tolerance for a decal on an aerial vehicle may have a wider tolerance range than the alignment tolerance for the positioning of the power supply on the aerial vehicle. If it is determined that the assembled parts are not within the tolerance range, assembly verification fails, as in 406, and corrective action may be determined, as discussed above.

If the assembled parts are within the alignment tolerance, a determination is made as to whether the identifiers on the parts are correctly positioned, as in 408. As discussed above with respect to FIG. 5B, parts of a WIP object may include identifiers and the identifiers may correspond to defined positions when the parts are properly assembled, images of the assembled parts of the WIP object may be processed to determine if the identifiers are correctly positioned. If it is determined that the identifiers are correctly positioned, the assembly of the parts of the WIP object are verified as correct, as in 410. However, if it is determined that the position of the identifiers is not correct, the assembly is determined to be incorrect, as in 406, and corrective action to resolve the error may be determined.

In addition to providing assembly instructions to workers, monitoring the assembly process, providing confirmations of correct assembly or corrective action to resolve incorrect assembly, in some implementations, the methods and systems discussed herein may be used to enable direct communication between a worker and an external user. For example, if a worker experiences an assembly problem, the worker may communicate with an external user, such as an engineer, that can provide guidance to the worker, in the form of visual and/or audible information, to aid the worker in the assembly process.

Figure 6A:
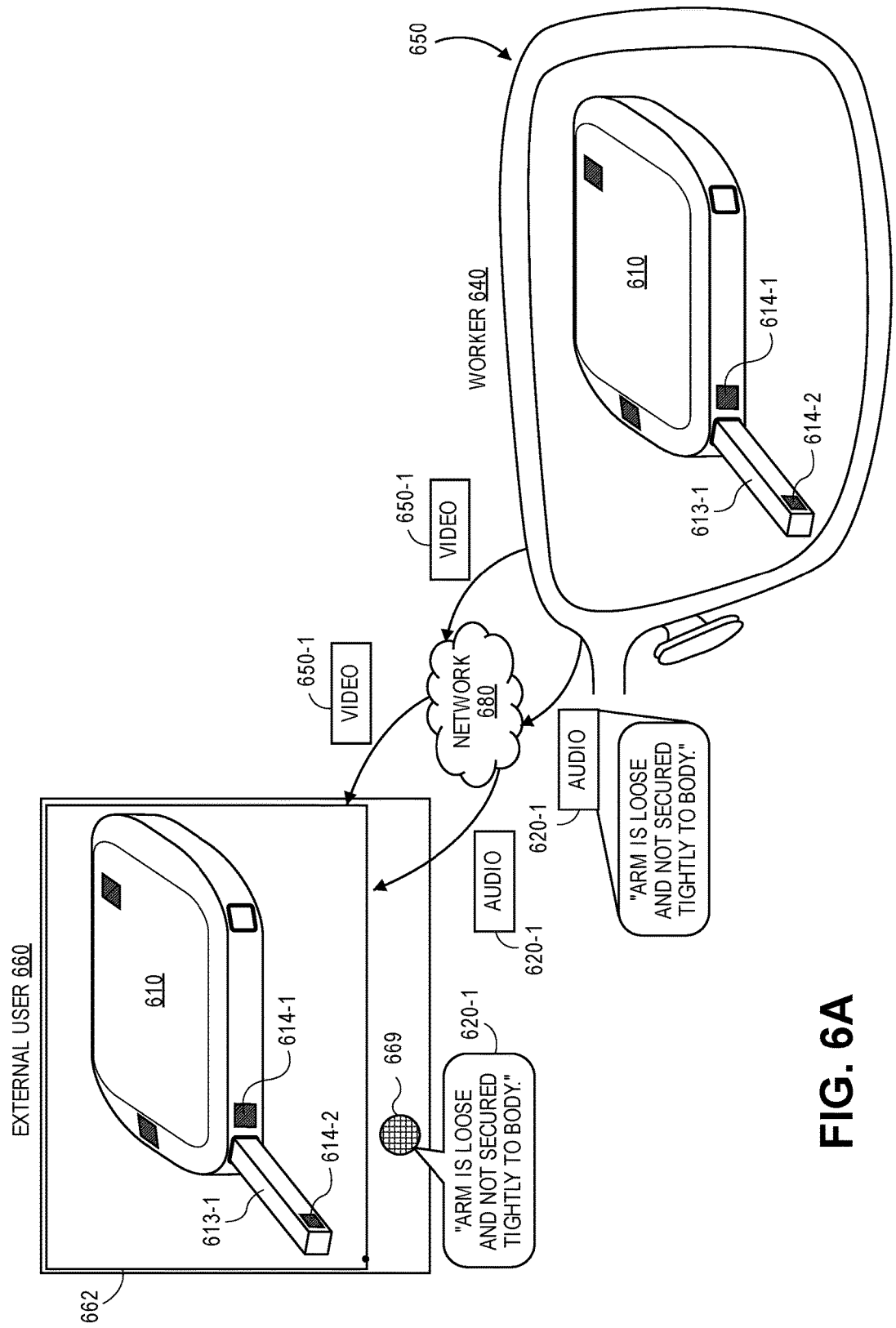
FIGS. 6A-6B illustrate an augmented reality environment in communication with an external user, in accordance with implementations of the present disclosure.
Figure 6B:
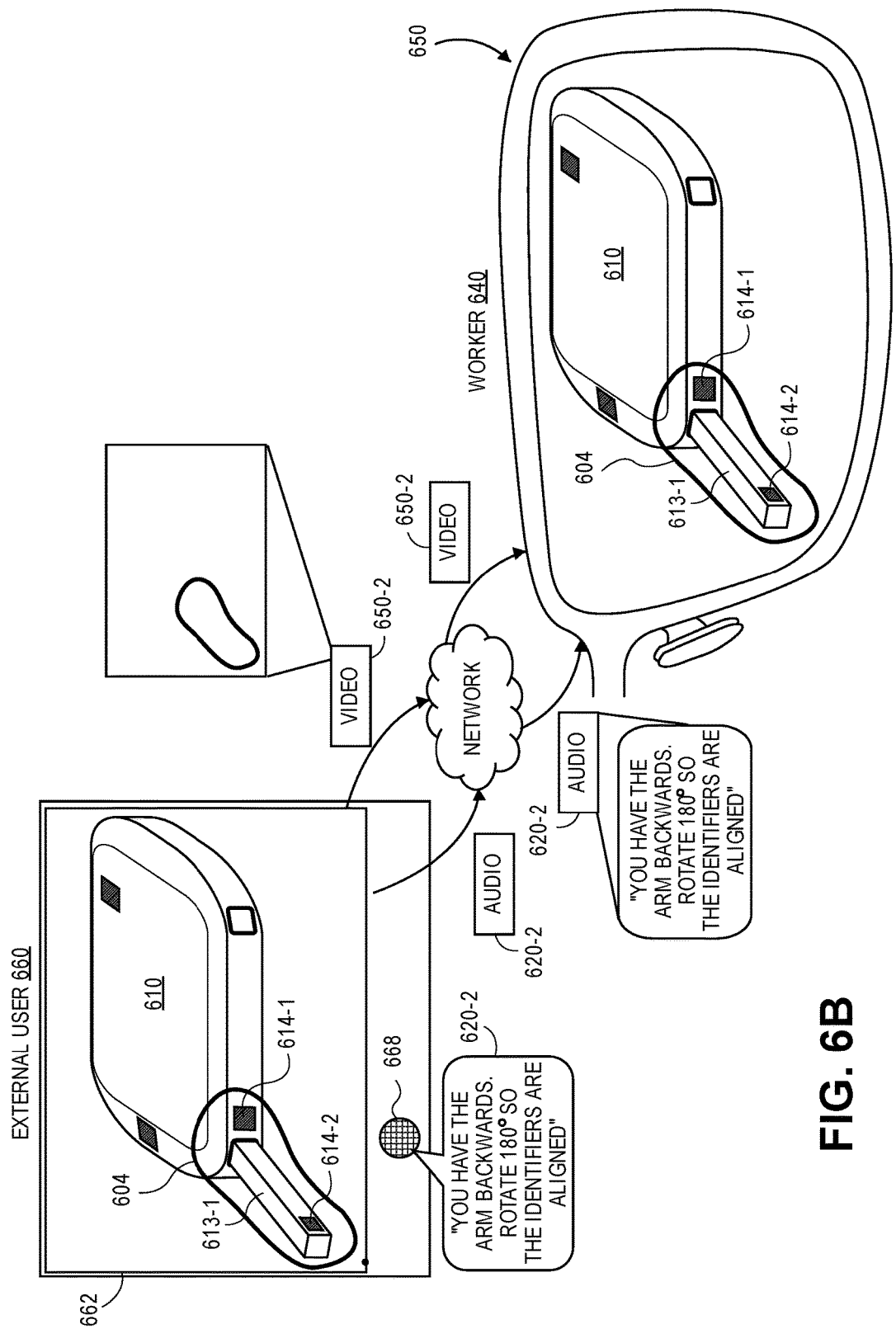

FIGS. 6A-6B illustrate a communication between a worker 640 and an external user 660, in accordance with described implementations. In the illustrated example, the worker 640 experiences an assembly problem with the attachment of motor arm 613-1 to the body 610 of the aerial vehicle. The worker 640, while viewing the WIP object that currently includes the body 610 and the motor arm 613-1 using the AR glasses 650 may establish a communication session with the external user via a network 680 and transmit audio data 620-1 and/or video data 650-1 from the AR glasses 650 to a computer 662 of the external user 660. For example, the video data may include the view of the workstation from the perspective of the user as imaged by the imaging device of the AR glasses. The video data 650-1 may be transmitted in real time, or near real time, and presented on the display of the computer 662 of the external user so that the external user can view the WIP object from the same perspective as the worker. In addition, the worker may provide audio output, such as "Arm Is Loose And Not Secured Tightly To The Body." The audio output is captured by the microphone of the AR glasses 650 and transmitted to the computer 662 of the external user 660 in real time or near real time as audio data 620-1. The computer 662, upon receipt of the audio data 620-1 outputs the audio data as presented audio data to the external user via one or more speakers 669 of the computer 662.

The external user, viewing the presented video data 650-1 and audio data 620-1, may interact with the computer 662 and provide information back to the worker 640. For example, the external user viewing the video data 650-1 may determine that the motor arm 613-1 is improperly installed based on the mis-alignment of the identifiers 614-1 and 614-2.

Referring to FIG. 6B, the external user may provide information back to the worker to assist the worker in assembly of the WIP object. For example, the external user 660 may generate video data, such as drawing an annotation 604 on the received video data to indicate the part that is incorrectly assembled. As discussed, the external user 660 may use any form of input device, such as a touch-based display or pointer, to generate an input such as the annotation 604. The annotation 604 may be recorded by the computer 662 and transmitted as video data 650-2. As illustrated, the video data may only include the annotation or other inputs provided by the external user and not the video data 650-1 originally received from the user. In this manner, the video data 650-2 may be generated and presented on the display of the AR glasses to augment the view of the worker 640 such that it appears as if the external user 660 is providing annotations of the actual parts viewed by the worker 640 through the AR glasses 650. For example, the annotation 604 is rendered by the AR glasses and from the perspective of the worker 640 encircles the motor arm 613-1, identifier 614-1 and identifier 614-2.

In addition to providing video data from the computer 662 to the AR glasses of the worker 640, the external user may provide audio, such as "You Have The Arm Backwards. Rotate 180 Degrees So The Identifiers Are Aligned." The audio is received by the microphone 668 of the computer 662 and transmitted in real time or near real time as audio data 620-2 from the computer 662 to the AR glasses 650 worn by the worker 640. The AR glasses, in addition to presenting the video of the annotation on the display of the AR glasses, outputs the audio from speakers of the glasses.

Transmission of video and/or audio data between the AR glasses 650 of the worker 640 via the network 680 may be bi-directional such that video data and audio data may be sent and presented by both devices in real time or near real time to facilitate communication between the worker 640 and the external user 660. While the illustrated example describes communication between one worker 640 and one external user 660, it will be appreciated that the described implementations may be utilized in a one to many communication and/or a many to many communications. For example, the AR glasses of one worker may communicate with multiple computers of multiple different external users. In such an implementation, the AR glasses may transmit audio data and video data to each of the multiple computers of external user as well as receive and present video data from each of the multiple computers of the external users. In some implementations, any received video data may be overlaid and presented with other received video data. Likewise, video data and/or audio data received from one external user may be transmitted and presented by the computers of other external users so that all external users and workers experience the same augmented view and/or audio as the worker 640.

Real time or near real time video and audio communication between a worker and an external user improves on existing systems by enabling immediate feedback and problem resolution to workers without requiring the workers to stop assembly, call for assistance, and wait for assistance to arrive. This improvement increases the speed and accuracy of assembly operations by reducing the time necessary to wait for another user, such as an engineer to physically come to the workstation to discuss the assembly problem with the worker. Likewise, rather than requiring the user, such as an engineer, to be onsite and available for assembly problem resolution, the disclosed implementations allow the user to be remote from the assembly location. As such, the same external user may provide assembly assistance and/or monitor many different assembly centers at the same time.

Figure 7:
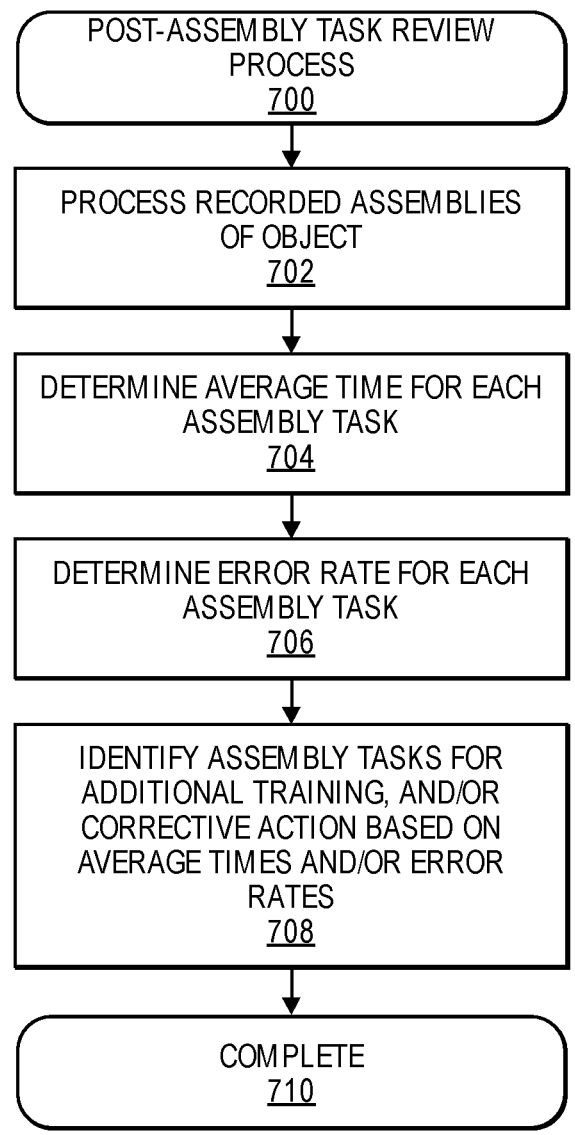
FIG. 7 illustrates an example post-assembly task review process, in accordance with implementations of the present disclosure.

FIG. 7 illustrates an example post-assembly test review process 700, according to described implementations. The example process 700 begins by processing recorded assemblies of an object, as in 702. As discussed above, as workers wearing AR glasses assemble objects, images and/or video of the assembly, along with any interactions (e.g., confirmation of assembly task completion) from the worker may be recorded and stored in a data store by the assembly service. The recordings of two or more assemblies of an object may be processed using one or more image processing algorithms and/or based on interactions from the workers. For example, a worker may be required to provide an interaction or other input upon completion of each assembly task. Based on the inputs, time durations for each assembly task may be determined. Likewise, the video data of each assembly task may be processed to determine if the assembly was completed correctly, as discussed above.

Based on the processed video data, an average time required by the workers to complete each assembly task for the object is determined, as in 704. For example, if there are one-hundred recordings of different workers assembling an object, a time duration for each assembly task may be determined and an average computed for each assembly task for the object based on the time durations.

In addition to determining the average time required to complete each assembly task, an error rate for each assembly task may be determined, as in 706. The error rate may indicate a frequency with which each assembly task is improperly performed and/or the rate at which each assembly task requires reworking to correct an incorrect assembly by a worker. In some implementations, a determination may also be made as to the frequency with which communication with an external user is required for each assembly task.

Based on the average times and/or error rates, one or more assembly tasks may be identified as candidates for additional training and/or corrective action, as in 708. For example, the assembly tasks with the longest average time and/or the highest error rates may be identified as candidates for additional worker training to reduce the time required to complete the task and/or to reduce the error rate. In other examples, the identified assembly tasks may be reviewed to determine if any efficiencies are available by altering the assembly task and/or the assembled parts. As another alternative, the assembly task may be modified to provide additional augmented reality information to the worker as the worker is performing the assembly tasks. For example, the relevant portions of a CAD illustration may be presented to the worker as the worker is performing the assembly task. As another example, additional annotations may be presented as part of the augmented realty information to the worker illustrating the proper assembly of the parts for the assembly task. Finally, the identified assembly tasks may be modified and/or additional training may be provided to workers performing the assembly task and the process completes, as in 710.

Figure 8:
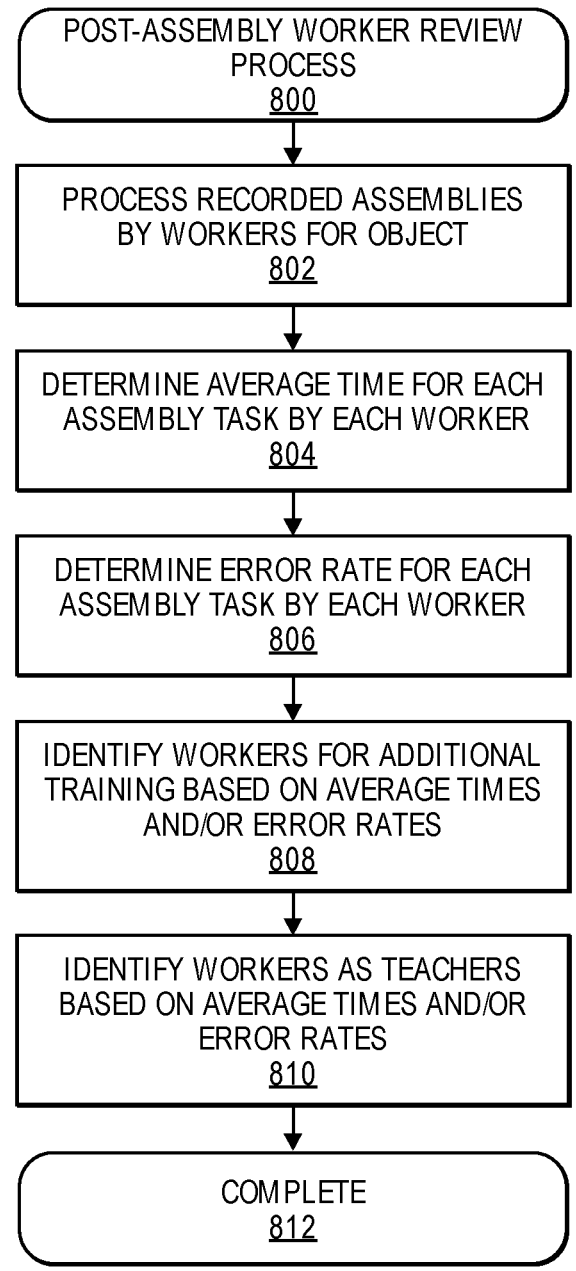
FIG. 8 illustrates an example post-assembly worker review process, in accordance with implementations of the present disclosure.

FIG. 8 illustrates an example post-assembly worker review process 800, according to described implementations. The example process 800 begins by processing recorded assemblies of an object by workers that performed the assemblies, as in 802. As discussed above, as workers wearing AR glasses assemble objects, images and/or video of the assembly, along with any interactions (e.g., confirmation of assembly task completion) from the worker may be recorded and stored in a data store by the assembly service. The recordings of two or more assemblies of an object may be processed using one or more image processing algorithms and/or based on interactions from the workers. For example, a worker may be required to provide an interaction or other input upon completion of each assembly task. Based on the inputs, time durations for each assembly task performed by each worker may be determined. Likewise, the video data of each assembly task may be processed to determine if the worker completed the assembly correctly, as discussed above.

Based on the processed video data, an average time required by each worker to complete each assembly task for the object is determined, as in 804. For example, if there are one-hundred recordings for each worker performing an assembly task for an object, an average time required by each worker may be determined for the assembly tasks by averaging each of the one-hundred time durations for each worker.

In addition to determining the average time required by each worker to complete each assembly task, an error rate for each worker for each assembly task may be determined, as in 806. The error rate for each worker may indicate a frequency with which each worker properly or improperly performs each assembly task and/or the rate at which each worker is required to rework an assembly task to correct an incorrect assembly by the worker. In some implementations, a determination may also be made as to the frequency with which communication with an external user is required for each assembly task by each worker. Likewise, an overall average time for each worker may be determined based on the time required by the worker to perform all assembly tasks and an overall error rate for all assembly tasks performed by the worker may also be determined.

Based on the average times and/or error rates, one or more workers may be identified as candidates for additional training and/or corrective action, as in 808. For example, the workers with the longest average time to complete an assembly task and/or the highest error rates for an assembly task may be identified as candidates for additional worker training for the assembly task to reduce the time required to complete the task and/or to reduce the error rate. In other examples, the workers may be reassigned to other assembly tasks that they perform faster and/or with a higher degree of accuracy.

In some implementations, workers that perform assembly tasks faster and/or with higher degrees of accuracy may also be identified as potential teachers to assist other workers, as in 810. For example, the processed data may identify workers that consistently perform better than other workers. Such workers may be beneficial to promote and/or to recruit to train other workers. Finally, the identified workers may receive additional training and/or be recruited as teachers, reassigned to different assembly tasks, and/or other actions may be performed and the process completes, as in 812.

Figure 9:
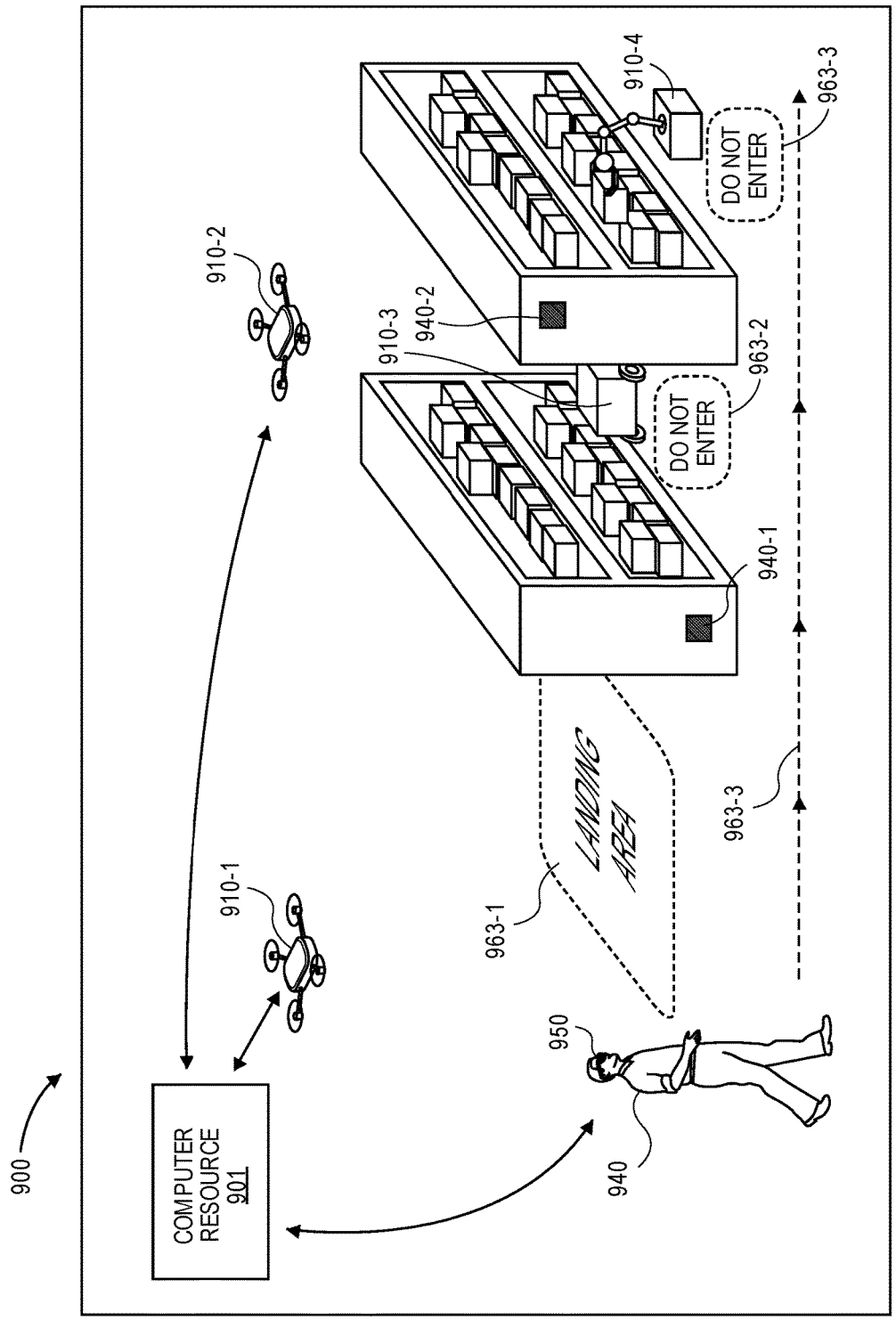
FIG. 9 illustrates an example environment utilizing AR glasses to present safe paths and restricted areas, in accordance with implementations of the present disclosure.

While the above examples illustrate technological improvements for assembly of objects and interactive communication between workers and external users, the described implementations may also be utilized to increase worker safety as workers move about an assembly center. For example, FIG. 9 illustrates a view of an assembly center 900, or other area, in which one or more autonomous units 910, such as aerial vehicles 910-1, 910-2, ground based units 910-3, robotic arm units 910-4, and/or other robotic or autonomous units, are or may be operating in conjunction with a worker 940, in accordance with described implementations.

While a worker is typically at a workstation performing tasks, in some instances the worker may need to move about the assembly center (e.g., to go on break, retrieve additional parts and/or tools, etc.). To increase the safety of the worker 940, a computer resource 902 may provide augmented reality data to the AR glasses 950 worn by the worker that results in the AR glasses presenting augmented reality information that indicates safe paths 963-3 that the worker may follow and/or restricted areas, such as Landing Area 963-1, Do Not Enter area 963-2, and/or Do Not Enter area 963-3 where the worker is not to enter.

In some implementations, the autonomous units 910 may communicate with and/or receive navigation instructions from the computer resource 901 and the computer resource may know the current position and path of each autonomous unit, such as aerial vehicles 910-1 and 910-2. Likewise, the computer resource may know the current position of the worker 950 as the worker moves about the assembly center. Based on the known current position of the worker, the known current position of the autonomous units, and the path of the autonomous units, the computer resource may determine safe and/or unsafe areas for the worker. Visual data in the form of augmented reality may be transmitted to the AR glasses worn by the worker and presented by the AR glasses to provide the worker with an augmented reality indicating to the worker where the worker may safely move within the assembly center, for example along path 963-3, and areas that are restricted or prohibited from entry by the worker 940, such as Landing Area 963-1 and/or restricted areas 963-2, 963-3.

In some implementations, indoor positioning information or other location based information may be utilized by the AR glasses 950, the computer resource 901, and/or the autonomous units 910 to determine the position, orientation, and/or field of view of the AR glasses and/or the autonomous units. In other examples, identifiers 940-1, 940-2 may be present within the assembly center that are detected by the AR glasses and/or the autonomous units and used by the AR glasses, the autonomous units, and/or the computer resource to determine the position, orientation and/or field of view of the worker and/or the autonomous units. Based on the field of view of the worker, the appropriate augmented reality information may be presented to the user to increase the safety of the user as the user moves about the assembly center.

Figure 10:
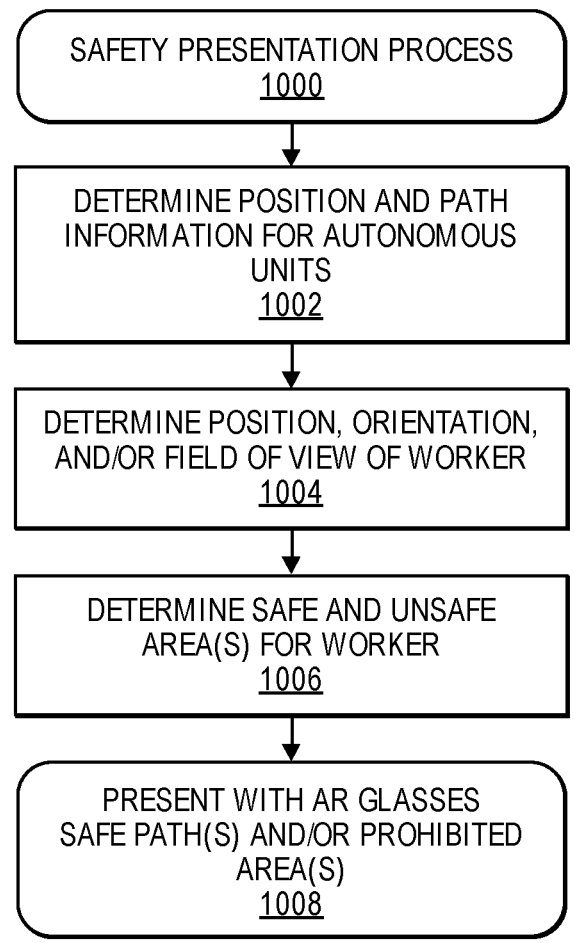
FIG. 10 illustrates an example safety presentation process, in accordance with implementations of the present disclosure.

FIG. 10 illustrates an example, safety presentation process 1000, according to described implementations. The example process 1000 begins by determining the current position and flight path information for each autonomous unit operating within the assembly center, as in 1002. For example, each aerial vehicle may periodically report position information to the computer resource during operation. Likewise, each ground based unit may periodically report position information to the computer resource. The position of other autonomous units may likewise be periodically received and/or determined by the computer resource. The position information may include, but is not limited to, global positioning information (GPS), indoor positioning information, and the like. In addition, the position, orientation, and/or field of view of the worker wearing AR glasses is determined, as in 1004. A variety of techniques may be used alone or in combination to determine the position, orientation, and/or field of view of the worker. For example, the AR glasses may include a positioning component, such as an indoor positioning component, accelerometer, compass, etc., that may periodically provide position and/or orientation information to the computer resource. As another example, image data from the AR glasses may be processed by the AR glasses and/or the computer resource to detect identifiers positioned throughout the assembly center that is within the field of view of the glasses. Each identifier may be unique and correspond to a specific location within the assembly area. Upon detection of an identifier, the position, orientation, and field of view of the worker may be determined based on the known position of the identifier within the assembly center. In still other examples, one or more imaging components positioned within the assembly center may produce images of the assembly center that are processed by the computer resource to detect the position, orientation, and/or movement of the worker within the assembly center.

Based on the determined position of each autonomous unit, the determined position of the worker, and the determined path of each autonomous unit, safe and unsafe areas for the worker are determined, as in 1006. Safe areas may include any area where the autonomous units are not and will not be operating during a defined period of time. In comparison, unsafe areas include areas where autonomous units are currently operating and/or will be operating during a defined period of time (e.g., landing area, ground navigation path). In some implementations, unsafe areas may include any vertical column of area in which an aerial vehicle is or will be operating. For example, if an aerial vehicle is navigating within the assembly center at approximately thirty feet above the surface of the assembly center, the unsafe area may include any area vertically below the aerial vehicle. Other examples of unsafe areas may include areas that intersect with or include a navigation path of a ground based unit.

Based on the determined safe and unsafe areas, and the determined field of view of the worker, augmented reality is generated and presented by the AR glasses to indicate visually to the worker safe paths that may be navigated by the worker and/or unsafe or prohibited areas that are not to be entered by the worker as the worker moves about the assembly center, as in 1008.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the pertinent art will recognize that the utility of the systems and methods disclosed herein is not limited to aerial vehicle assembly, and may be further utilized to provide information regarding any object and/or any type of assembly. Additionally, those of ordinary skill in the pertinent arts will recognize that the term "identifier," as used herein, may include not only markings such as bar codes or sets of numbers, text or other characters, but also any form of visual data that may be recognized regarding a part and/or an object, including one or more edges, contours, shapes or other visually discernible aspects of the object. Information regarding a part, object, assembly task, etc., may be identified based on an interpretation of a single identifier, or of multiple identifiers in combination with one another, as well.

Moreover, the systems and methods of the present disclosure may scan, read or otherwise evaluate a marking, a label or another identifier locally, e.g., at the AR glasses where such identifiers are scanned, or may transmit information regarding the identifiers to an external computing system or server, for remote processing.

Additionally, although many of the implementations described herein or shown in the accompanying figures are described for use in an assembly center environment, the systems and methods are not so limited, and may be employed in any environment. Moreover, although many of the implementations described herein are directed to virtually illustrating content information using computer system components such as wearable computer devices (e.g., augmented reality glasses), the systems and methods are also not limited.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3, 4, 7, 8, and 10, the order in which the boxes or steps of the methods or processes are listed is not intended to be construed as a limitation, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more implementations or that one or more implementations necessarily include logic for deciding, with or without user input or prompting, whether these features, elements and/or boxes or steps are included or are to be performed in any particular implementation.

Although the invention has been described and illustrated with respect to exemplary implementations thereof, the foregoing and various other additions and omissions may be made therein and thereto without departing from the spirit and scope of the present disclosure.

What is claimed is:

1. A system comprising:
a wearable frame;
a sensor device mounted to the wearable frame;
a display device mounted to the wearable frame; and
a computing device in communication with at least one of the sensor device or the display device,
wherein the computing device is configured to at least:
detect a scale included at a workstation, the scale providing a reference point to determine a relative size or a relative position of one or more parts at the workstation;
determine, based at least in part on a comparison of a first part at the workstation and the scale, an identity of the first part;
determine an identifier on the first part positioned at the workstation;
determine an assembly task to be performed by a worker located at the workstation and wearing the wearable frame, the assembly task determined based at least in part on the workstation, the worker, or the first part;
select augmented reality data corresponding to the assembly task to be performed; and
cause a display of the augmented reality data on the display device such that the augmented reality data is presented in a field of view of the worker.

2. The system of claim 1, wherein the computing device is further configured to at least:
record video data representative of an assembly of the first part with a second part as part of the assembly task.

3. The system of claim 2, wherein the computing device is further configured to at least:
process the video data to determine that the assembly of the first part with the second part was correctly completed.

4. The system of claim 1, wherein the augmented reality data includes a visual animation of an assembly of the first part with a second part.

5. The system of claim 1, wherein the augmented reality data includes a visual representation of a computer-aided drawing of at least a portion of an object being assembled.

6. A method for virtually illustrating information, comprising:
detecting a scale within a field of view of a worker wearing augmented reality (AR) glasses, the scale providing a reference to determine a relative size or a relative position of one or more parts within the field of view;
interpreting at least one identifier associated with a part positioned within the field of view of the worker wearing the AR glasses based at least in part on the scale;
determining augmented reality data regarding the part based at least in part on the at least one identifier using a first computer device, wherein the augmented reality data regarding the part is stored in at least one data store; and
causing a display of the augmented reality data by the AR glasses such that the augmented reality data is in the field of view of the worker while the worker is viewing the part.

7. The method of claim 6, further comprising:
receiving a request from the worker for an assistance with respect to the part;
transmitting video data corresponding to the field of view of the worker from the AR glasses to at least one of the external computing devices;
receiving, from the at least one external computing device, annotation data corresponding to a visual input provided at the at least one external computing device; and
causing a display of the annotation data by the AR glasses such that the annotation data is in the field of view of the worker.

8. The method of claim 7, further comprising:
receiving, from the at least one external computing device, audio data corresponding to audio provided by the at least one external computing device; and
causing an audible output such that the audio data is audibly presented to the worker.

9. The method of claim 7, wherein the video data and the annotation data are transmitted and presented in real time or near real time.

10. The method of claim 6, wherein the augmented reality data corresponds to an assembly task for assembly of the part with a work in progress object to be assembled.

11. The method of claim 10, further comprising:
detecting an interaction by the worker indicating a completion of the assembly task;
determining a second assembly task to be completed by the worker; and
causing a display of second augmented reality data corresponding to the second assembly task by the AR glasses such that the second augmented reality data is presented in the field of view of the worker while the worker is viewing a second part.

12. The method of claim 11, further comprising:
processing data from the AR glasses to verify that the assembly task was correctly completed.

13. The method of claim 6, wherein the display of the augmented reality data includes a visual indicator that is positioned adjacent the part to indicate the part to the worker.

14. The method of claim 6, further comprising:
causing a display, by the AR glasses, of a task progress indicator indicating a progress through a plurality of tasks to complete assembly of an object.

15. A non-transitory computer-readable medium having computer-executable instructions stored thereon,
wherein the computer-executable instructions, when executed, cause a computer system having at least one computer processor to perform a method comprising:
detecting a scale included at a workstation, the scale providing a reference to determine a relative size or a relative position of one or more parts at the workstation;
determining an object to be assembled at the workstation based at least in part on the scale;
determining an assembly task to be performed by a worker positioned at the workstation as part of an assembly of the object;
determining augmented reality data corresponding to the assembly task; and
presenting the augmented reality data such that the augmented reality data is visually presented in a field of view of the worker and visible by the worker while the worker views at least one part corresponding to the object.

16. The non-transitory computer-readable medium of claim 15,
wherein the computer-executable instructions, when executed, cause the computer system having the at least one computer processor to perform the method further comprising:
detecting an identifier corresponding to the at least one part positioned at the workstation; and
wherein the augmented reality data is presented to visually indicate the at least one part to the worker.

17. The non-transitory computer-readable medium of claim 15,
wherein the computer-executable instructions, when executed, cause the computer system having the at least one computer processor to perform the method further comprising:
determining that the assembly task has been completed;
determining a second assembly task to be performed by the worker positioned at the workstation as part of the assembly of the object;
determining second augmented reality data corresponding to the second assembly task; and
presenting the second augmented reality data such that the second augmented reality data is visually presented in the field of view of the worker and visible by the worker while the worker views at least one second part corresponding to the object.

18. The non-transitory computer-readable medium of claim 15,
wherein the computer-executable instructions, when executed, cause the computer system having the at least one computer processor to perform the method further comprising:
determining that the assembly task has been completed; and
processing an image of the field of view of the worker to verify that the assembly task has been properly completed.

19. The non-transitory computer-readable medium of claim 15,
wherein the computer-executable instructions, when executed, cause the computer system having the at least one computer processor to perform the method further comprising:
recording video data of the assembly task performed by the worker; and
determining a time duration required by the worker to perform the assembly task.

20. The non-transitory computer-readable medium of claim 19,
wherein the computer-executable instructions, when executed, cause the computer system having the at least one computer processor to perform the method further comprising:
determining a plurality of time durations required to perform the assembly task by a plurality of workers;
determining from the time duration and the plurality of time durations, an average time duration required to complete the assembly task; and
determining, based at least in part on the average time duration, that at least one of the augmented reality data corresponding to the assembly task or the assembly task is to be revised to decrease a time duration required to complete the assembly task.

* * * * *